United States Patent [19]
Hiebert

[11] Patent Number: 5,865,618
[45] Date of Patent: Feb. 2, 1999

[54] SELF-REGULATING FORCED AIR HEATER

[76] Inventor: Jacob F. Hiebert, 23205 East Clayton Ave., Reedley, Calif. 93654

[21] Appl. No.: 987,947

[22] Filed: Dec. 10, 1997

[51] Int. Cl.$^6$ ........................................................ F24H 3/04
[52] U.S. Cl. ................. 432/222; 126/110 A; 126/110 C; 126/104 A
[58] Field of Search ..................................... 432/219, 222; 126/110 AA, 110 A, 110 B, 110 C, 110 D, 99 A, 104 A, 116 A

[56] References Cited

U.S. PATENT DOCUMENTS

| | | | |
|---|---|---|---|
| 3,494,599 | 2/1970 | Stupak, Jr. et al. ..................... | 432/223 |
| 3,645,512 | 2/1972 | Dent et al. ................................ | 432/223 |
| 4,108,143 | 8/1978 | Pelsue et al. ......................... | 126/100 B |
| 4,231,735 | 11/1980 | Downs .................................... | 432/222 |
| 4,244,349 | 1/1981 | Velie et al. .............................. | 432/222 |
| 4,309,978 | 1/1982 | Hensiek et al. ......................... | 432/219 |
| 4,651,711 | 3/1987 | Velie ....................................... | 432/222 |
| 4,848,313 | 7/1989 | Velie ....................................... | 432/222 |
| 5,399,086 | 3/1995 | Potter et al. ............................ | 432/222 |

*Primary Examiner*—Teresa Walberg
*Assistant Examiner*—Gregory A. Wilson
*Attorney, Agent, or Firm*—Madson & Metcalf

[57] ABSTRACT

A self-regulating forced-air heater includes a housing in which is located an air passageway. A blower forces air through the air passageway, including into and out of a combustion chamber. A burner disposed within the combustion chamber combusts a fuel and air mixture to heat the air exiting of the combustion chamber. A venturi effect is used to draw the fuel and air mixture through the burner and into the combustion chamber. An adjustable venturi plate assembly is positioned between the blower and the burner, and expands or contracts in surface area to increasingly or decreasingly block the center of the air passageway. A control assembly includes an electronically controlled valve, an electronic controller, an electrical actuator, and a temperature sensor. The electronic controller monitors the temperature sensor, determines if an adjustment is needed in heat output, and in response thereto, adjusts the temperature of the air exiting the self-regulating forced-air heater. In so doing, the electronic controller signals the electrical actuator to increase or decrease of the surface area of the venturi plate, signals the electrically controlled valve to increase or decrease the volume of fuel supplied to the burner, and signals the blower to increase or decrease the rate at which air is forced through the passageway.

26 Claims, 5 Drawing Sheets

SELF-REGULATING FORCED AIR HEATER

BACKGROUND OF THE INVENTION

1. The Field of the Invention

The present invention relates to forced-air heaters that are relatively compact, yet provide high outputs of heated air. More particularly, the present invention relates to a forced-air heater that is self-regulating and automatically adjustable between different heat output settings in order to quickly heat an environment to a selected temperature and thereafter efficiently maintain the environment at the selected temperature.

2. The Relevant Technology

Forced-air heaters are also known as space heaters and have traditionally been used to heat large open spaces that require high volumes of heated air in order to maintain a comfortable environment. In order to efficiently use forced-air heaters to heat smaller spaces, recent steps have been taken to reduce the size of the forced-air heaters and to make them portable. An early portable forced-air heater is described in U.S. Pat. No. 3,494,599, issued to Joseph J. Stupak, Jr., et al.

Traditionally, forced-air heaters are contained within a single housing. An air passageway extends through the housing from an air inlet opening to an air outlet opening. A blower draws air in through the air inlet opening and forces it into a combustion chamber within the air passageway. A burner at or near the entrance to the combustion chamber supplies a mixture of fuel and air into the combustion chamber, where the fuel and air mixture is ignited. The resulting combustion heats the air as it passes through the combustion chamber to the air outlet opening.

The fuel, typically propane or natural gas, is supplied to the burner by a venturi tube. The venturi tube typically comprises a fuel-air mixture pipe into which fuel is released from a fuel supply under pressure. Outside air is also allowed to enter the fuel-air mixture pipe and mix with the fuel. A venturi effect caused by the air passing through the combustion chamber draws the mixture of fuel and air into the combustion chamber, where the fuel and air mixture is ignited.

A platelike flame spreader is frequently employed in such forced-air heaters and is normally located between the blower and the combustion chamber to create a low pressure region around the edges of the burner. The low pressure region tends to spread out the area in which combustion takes place, which causes the fuel and air mixture to more fully combust. Turbulence is also created by the indirect path that the air must take to enter the combustion chamber due to the flame spreader. The turbulence causes the blower-driven air to better mix with the fuel-air mixture from the fuel and air mixture pipe, also helping the fuel to combust more thoroughly. Thorough combustion efficiently utilizes the fuel and also reduces carbon monoxide emissions.

One drawback to such designs is that the conventional forced-air heaters have been capable of heating air at only a single, constant heat output setting. One reason for this limitation is that the flame spreaders in conventional designs are sized to draw only a single, specified volume of fuel and air from the gas-air mixture pipe into the combustion chamber and spread that volume of the fuel and air mixture over a specified distance. Not spreading the fuel and air mixture far enough results in insufficient combustion and possibly, high carbon monoxide emission. Spreading the fuel and air mixture too far results in inconsistent combustion and excessive deposits within the combustion chamber.

Attempts have been made to increase the ranges of fuel and air mixture volumes that will burn cleanly and without buildups in a given forced-air heater. These attempts have included strategic placement of holes, fins and other air routing mechanisms in and on the flame spreader to better disperse and mix the fuel and air mixture with the air forced into the combustion chamber by the blower. Nevertheless, to date these attempts have not realized a satisfactory performance at more than a single heat output setting. The single heat output setting thus remains a limitation of conventional forced-air heaters.

In regulating the heat output of the conventional forced-air heaters provided with only a single heat output setting, the flow of fuel into the combustion chamber is alternately enabled and disabled. Thus, the typical operating cycle of these forced-air heaters begins operation at the standard heat output setting in which a predetermined fuel pressure and volume is passed into the combustion chamber at a predetermined blower speed until the environment being heated attains a selected temperature. Once the selected temperature is attained, the flow of fuel is disabled until the temperature of the environment being heated drops below the selected temperature to a predetermined extent. At that point, the flow of fuel is again enabled. This enablement/disablement sequence is repeated continuously during the operating cycle, and the blower may or may not be disabled concurrently with the disablement of the flow of fuel. This repeated enablement/disablement sequence is an inefficient use of fuel, and leaves much to be desired in maintaining a constant temperature of the environment being heated.

In order to lengthen the time intervals occurring between the enabling and the disabling of the flow of fuel, the standard heat output settings of conventional forced-air heaters are normally set at relatively low heat output settings. Consequently, when powering up a conventional forced-air heater after a period of non-use in which the temperature of an environment has dropped substantially below a desired temperature, the conventional forced-air heater takes an undesirably long period of time to heat the environment to the desired temperature.

BRIEF SUMMARY OF THE INVENTION

The present invention comprises a self-regulating forced-air heater which overcomes many of the above-discussed problems of the prior art. In one embodiment, the self-regulating forced-air heater comprises a combustion chamber and an air passageway passing through the combustion chamber. The air passageway is provided with an air inlet opening located at one end thereof and an air outlet opening located at a second end thereof.

A blower is disposed within the air passageway between the air inlet opening and the combustion chamber to force air in the air inlet opening, past the burner, through the combustion chamber, where it is heated by combustion of a fuel and air mixture, and out the air outlet opening. The blower is preferably of a type that has a variable speed, such as a two-speed fan. A burner is disposed within the air passageway at or near one side of the combustion chamber. A fuel and air mixture is emitted from the burner, and is ignited within the combustion chamber.

A fuel supply conduit provides fuel to the burner and is connected to a fuel source such as a natural gas line outlet or a propane tank. A fuel-air mixture pipe within the fuel supply conduit has an opening located outside the air passageway and receives fuel from a nozzle connected through tubing to the fuel source. Inside the fuel-air mixture pipe, the fuel is allowed to mix with air to create a fuel and air mixture that is drawn into the burner head through a second opening.

Under the present invention, an adjustable venturi plate assembly is disposed within the air passageway slightly upstream of the burner. The adjustable venturi plate assembly is oriented transverse to the flow of air through the air passageway and thus occupies a cross-sectional portion of the air passageway. A substantially planar surface area of the adjustable venturi plate assembly partially blocks the cross-sectional portion of the air passageway. In accordance with the present invention, the surface area of the adjustable venturi plate assembly is adjustable in order to alter the extent to which the cross-sectional segment of the air passageway is blocked.

In one embodiment, the adjustable venturi plate assembly is formed of a plurality of dynamically connected and partially overlapping moveable members which contribute to the primary surface area. The moveable members are transitionable back-and-forth between a more overlapping position and a less overlapping position to either expand or contract the surface area of the adjustable venturi plate assembly.

Preferably under this embodiment, a mounting fixture is used to pivotally fix one end of the moveable members in place within the air passageway. An adjusting member is dynamically connected to the mounting fixture and to the moveable members in a manner whereby rotation of the adjusting member transitions the moveable members back or forth between the more overlapping position and the less overlapping position and thereby alters the primary surface area of the venturi plate.

The moveable members preferably comprise a plurality of substantially planar vanes. More preferably, four such vanes are pivotally attached to the mounting fixture. The vanes are also dynamically connected to the adjusting member such that rotation of the adjusting member relative to the mounting fixture rotates the vanes with respect to each other. The relevant rotation transitions the vanes between the more and less overlapping positions and alters the primary surface area of the venturi plate.

More preferably, the vanes are arranged within a single plane, in an arrangement wherein the vanes partially overlap each other. The single plane is oriented within the air passageway substantially transverse to the flow of air in the air passageway to occupy the afore-mentioned cross-sectional area of the air passageway. Each of the vanes has a pivot point by which the vane is pivotally connected to the mounting fixture. A slot is also located on each of the vanes and is oriented in a direction extending out of path of rotation of the adjusting member. A plurality of fasteners fixed to the adjusting member are each slidably disposed within the slot of one of the vanes.

Rotation of the adjusting member relative to the mounting fixture in one direction causes the fasteners to slide toward one end of the respective slots in which the fasteners are disposed, and in so doing, exerts an outward force on the vanes, thereby forcing the vanes to pivot outward around the pivot points with respect to the path of rotation. Each of the vanes are thus transitioned from a low surface area arrangement in which the vanes overlap each other to a greater extent to a high surface area arrangement in which the vanes overlap each other to a lesser extent. Rotation of the adjusting member relative to the mounting fixture in an opposite direction causes the fasteners to slide toward the other ends of the slots and exerts an inward force on the vanes, thereby forcing the vanes to pivot around the pivot points and move inward with respect to the path of rotation. This inward rotation transitions the vanes from the high surface area arrangement to the low surface area arrangement.

A control assembly is also provided in one embodiment of the self-regulating forced-air heater of the present invention. The control assembly in its preferred form includes an electrical actuator driveably connected with the adjusting member. A temperature sensor is also included as part of the control assembly and is situated within the combustion chamber to assist in monitoring the temperature therein. The control assembly also includes an electronic controller which is electrically connected with the blower, with the temperature sensor, and with the actuator. An electrically controlled valve is preferably interposed between the connector and the nozzle or nozzles. The electronic controller is also electrically connected with the electrically controlled valve to regulate the volume of fuel passed through the electrically controlled valve and into the burner head.

With the use of the electronic controller, the variable speed blower, the adjustable venturi plate assembly, and the electrically controlled valve, the forced-air heater of the present invention is capable of operating under variable heat output settings. Under the present invention, the forced-air heater of the present invention can be constructed to have a plurality of heat output settings that are either continuously variable or that are set at discrete levels. To reduce cost, it is preferred that the self-regulating forced-air heater of the present invention be constructed to have two heat output settings in addition to a zero-heat output setting.

In a high heat output setting, the blower operates at a high speed, the electrically controlled valve is set to allow a high volume of fuel to pass, and the adjustable venturi plate assembly is set to a high surface area. In a low heat output setting, the blower operates at a low speed, the electrically controlled valve is set to allow a low volume of fuel to pass, and the adjustable venturi plate assembly is set to a low surface area.

In a preferred embodiment, the electronic controller communicates with the temperature sensor to obtain temperature data indicating the temperature of the air currently exiting the air outlet opening. Using this temperature data, the electronic controller determines whether an adjustment to the temperature of the air exiting the combustion chamber needs to be made in order to closely maintain a selected heat output level. If an adjustment is determined to be necessary, the electronic controller electrically communicates with the blower, the electrically controlled valve, and the actuator to signal each to respectively transition back or forth between the low heat output setting and high heat output setting.

As has been discussed above, the variable heat output settings of which the present invention is capable allows the use of a higher initial heat output setting than that which conventional forced-air heaters are normally provided with. At the higher heat output setting, an environment can be initially brought to a selected temperature much more quickly than with a conventional forced-air heater. Due to the variable heat output settings of which the present invention is capable, the heat produced can also be efficiently regulated without completely disabling the self-regulating forced-air heater. Accordingly, the self-regulating forced-air heater of the present invention is capable of consistently and efficiently maintaining a relatively constant heat output and thus, a consistent, comfortable temperature within an environment being heated.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
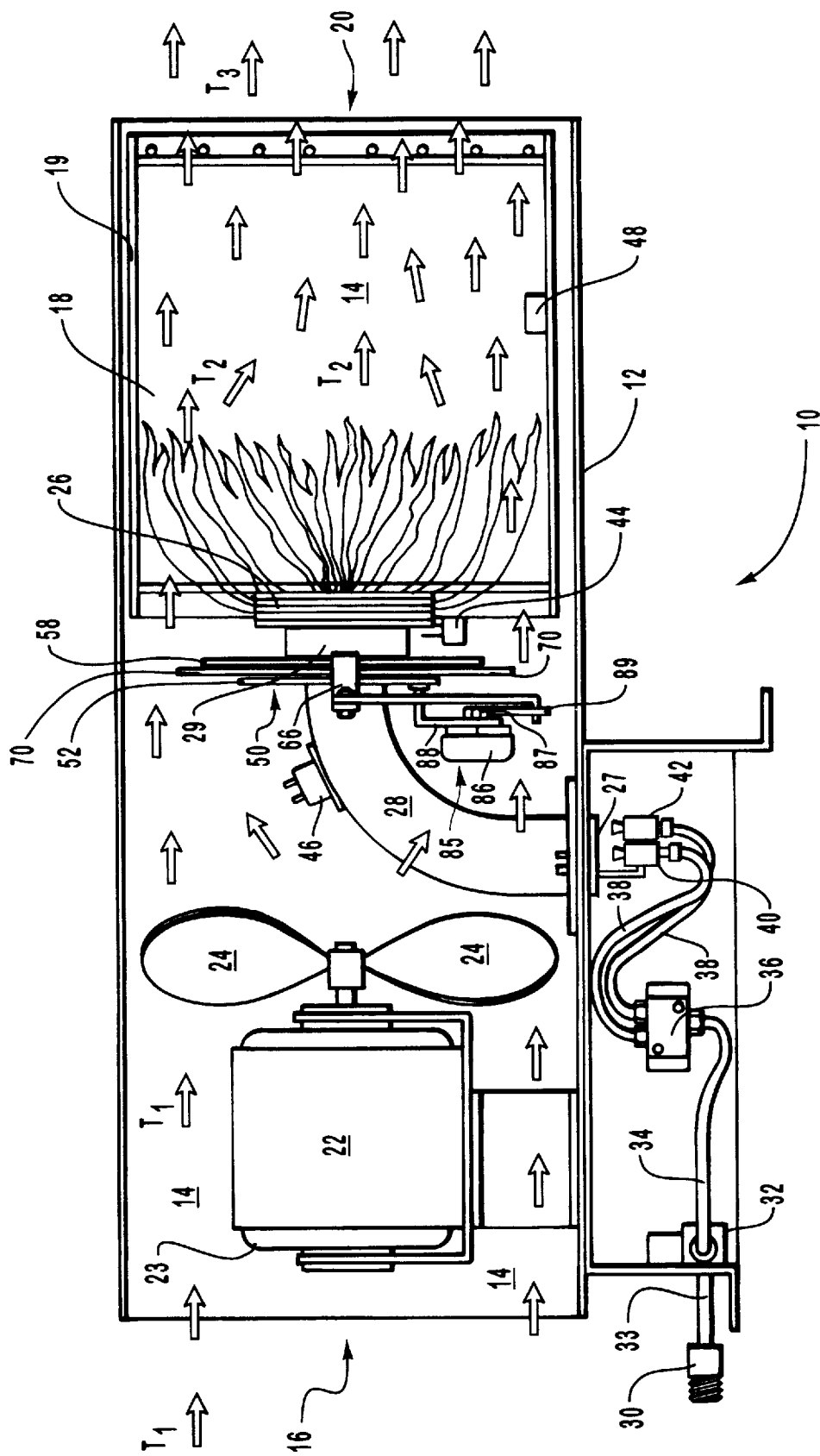
FIG. 1 is a cutaway view taken from the side showing one embodiment of the self-regulating forced-air heater of the present invention operating at a high heat output setting.
Figure 2:
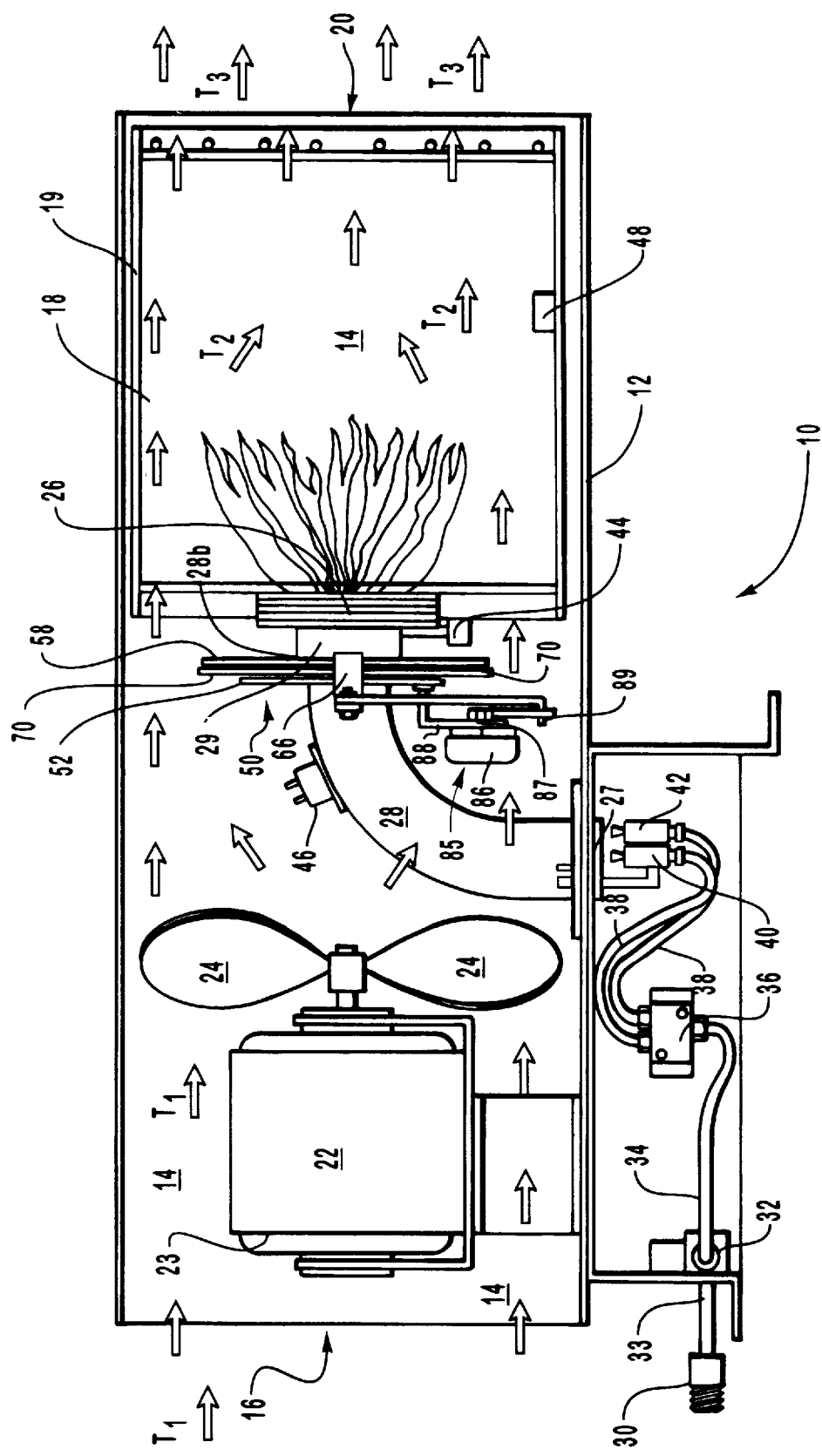
FIG. 2 is a cutaway view taken from the side of the self-regulating forced-air heater of FIG. 1 showing the self-regulating forced-air heater of the present invention operating at a low heat output setting.

Reference is now made to the drawings, wherein like parts are referred to by like numerals throughout. The drawings, in FIGS. 1 through 6, depict one embodiment of a self-regulating forced-air heater 10 of the present invention. Referring now to FIGS. 1 and 2, a self-regulating forced-air heater 10 of the present invention is shown to constitute a housing 12 and an air passageway 14 extending completely through the housing 12. The air passageway 14 extends from an air inlet opening 16 to an air outlet opening 20 and in so doing, passes through a combustion chamber 18 located within the housing 12 proximal to the air outlet opening 20. The combustion chamber 18 is configured with a continuous sidewall 19 and has a first end opening within the interior of the housing 12 and a second end opening to the outside environment, preferably concurrent with the air outlet opening 20. In order to maintain the exterior of the housing 12 at a safe temperature, the combustion chamber 18 is insulated from the housing 12.

A blower 22 is disposed within the air passageway 14 facing the combustion chamber 18 to force air through the combustion chamber 18. In the depicted embodiment, the blower 22 is mounted within the housing 12 proximate to the air inlet opening 16. The blower 22 draws air from the air inlet opening 16 and forces the air through the combustion chamber 18 and out the air outlet opening 20. Of course, the blower 22 could be located at other positions within or outside of the housing 12. In the depicted embodiment, the blower 22 comprises a fan provided with fan blades 24 and a motor 23. Preferably, the motor 23 is a variable speed motor, such as a two-speed AC motor or a DC motor. In the depicted embodiment, the motor 23 is a two-speed AC motor.

A burner head 26 is shown located within the housing 12 immediately upstream of the combustion chamber 18 in the air passageway 14. The burner head 26 is placed in gaseous communication with a fuel source (not depicted) through a fuel supply conduit. In the depicted embodiment, the fuel supply conduit comprises a fuel-air mixture pipe 28, which delivers a fuel and air mixture to the burner head 26. The burner head 26 of the depicted embodiment is constructed of spaced layers of stainless steel with an opening in the center thereof, into which a neck 29 of the fuel-mixture pipe 28 opens. Of course other types of burners, including a simple nozzle, could also be used. An ignitor 44, which could constitute a spark plug as is customary in the art, is located adjacent the burner head 26 and serves to ignite a fuel and air mixture passed into the combustion chamber 18 through the burner head 26.

The fuel supply conduit also comprises a connector 30 which is used to connect to the fuel source. A combustible fuel is used to form the fuel and air mixture and could constitute a liquid fuel such as heating oil. Preferably, however, the combustible fuel is gaseous, such as natural gas or propane for example. The fuel source accordingly comprises a natural gas line or a propane tank, preferably. The connector 30, in such a case, typically constitutes a threaded male connector.

In operation, the fuel is passed under pressure from the fuel source, through the connector 30, and through a tubing section 33 to an electrically controlled valve. In the depicted embodiment, the electrically controlled valve constitutes a solenoid valve 32. The fuel is thereafter passed through a second tubing section 34 into a nozzle 40 that is directed into an exterior opening 27 of the fuel-air mixture pipe 28. In order to achieve a better mix of the fuel with air, it is preferred that the nozzle comprise two or more nozzle heads. In the depicted embodiment, a divider valve 36 is used to apportion the fuel into two tubing segments 38 which each connect to one of two nozzle heads 40 and 42.

As shown in FIGS. 1 and 2, the nozzle heads 40 and 42 inject the fuel into the fuel-air mixture pipe 28. The nozzle heads 40 and 42 are spaced-apart from the fuel-air mixture pipe 28 a short distance to allow air to also enter the fuel-air mixture pipe 28. The fuel and air combine in the fuel-air mixture pipe 28 to create a gaseous fuel and air mixture that is combusted at the burner head 26.

In the depicted embodiment, a high temperature snap disk 46 is affixed to the fuel-air mixture pipe 28 as a safety feature. Whenever the temperature inside the housing 12 exceeds a predetermined safe level, the snap disk 46 engages to block the flow of the fuel and air mixture through the fuel-air mixture pipe 28. The use of snap disks is known in the art and will not be further described herein.

An adjustable venturi plate assembly 50 is disposed within the passageway 14 between the blower 22 and the burner head 26. In the depicted embodiment, the adjustable venturi plate assembly 50 has a circular center opening which allows the adjustable venturi plate assembly 50 to be assembled over the fuel-air mixture pipe 28. The adjustable venturi plate assembly 50 is oriented within the air passageway 14 substantially transverse to the flow of air to partially block the air passageway 14. This restriction is necessary to properly utilize a venturi effect which draws the fuel into the combustion chamber 18 through the burner head 26. The adjustable venturi plate assembly 50 also serves as a flame spreader, increasing the area over which the combustion spreads.

Under the present invention, the surface area of the adjustable venturi plate assembly 50 is adjustable in order to assist in regulating the temperature of the air exiting the self-regulating forced-air heater 10. When a relatively high heat output is required from the self-regulating forced-air heater 10, a high volume of fuel is allowed to pass through the burner head 26, and the blower 22 is operated at a higher speed. In order to properly combust the large volume of fuel, the adjustable venturi plate assembly 50 is adjusted to have a relatively large surface area that blocks to a large degree the portion of the air passageway 14 immediately upstream of the burner head 26. Such an arrangement is shown in FIG. 1. The large surface area spreads the flames of the combustion over a large area, avoiding high carbon monoxide emissions, and creates a stronger venturi effect to sufficiently draw the larger volume of fuel out of the fuel-air mixture pipe 28.

Conversely, when a relatively low heat output is desired, a relatively low volume of fuel is allowed to pass through the burner head 26, and the blower 22 is operated at a low speed. The adjustable venturi plate assembly 50 is correspondingly adjusted to have a relatively smaller surface area that blocks to a lesser degree the portion of the air passageway 14 immediately upstream of the burner head 26. This arrangement is shown in FIG. 2. The smaller surface area reduces the amount of flame spreading, avoiding excessive deposits of carbon and soot, while still achieving a desired venturi effect to draw out the lesser volume of fuel in a manner that maintains a consistent combustion.

Figure 3:
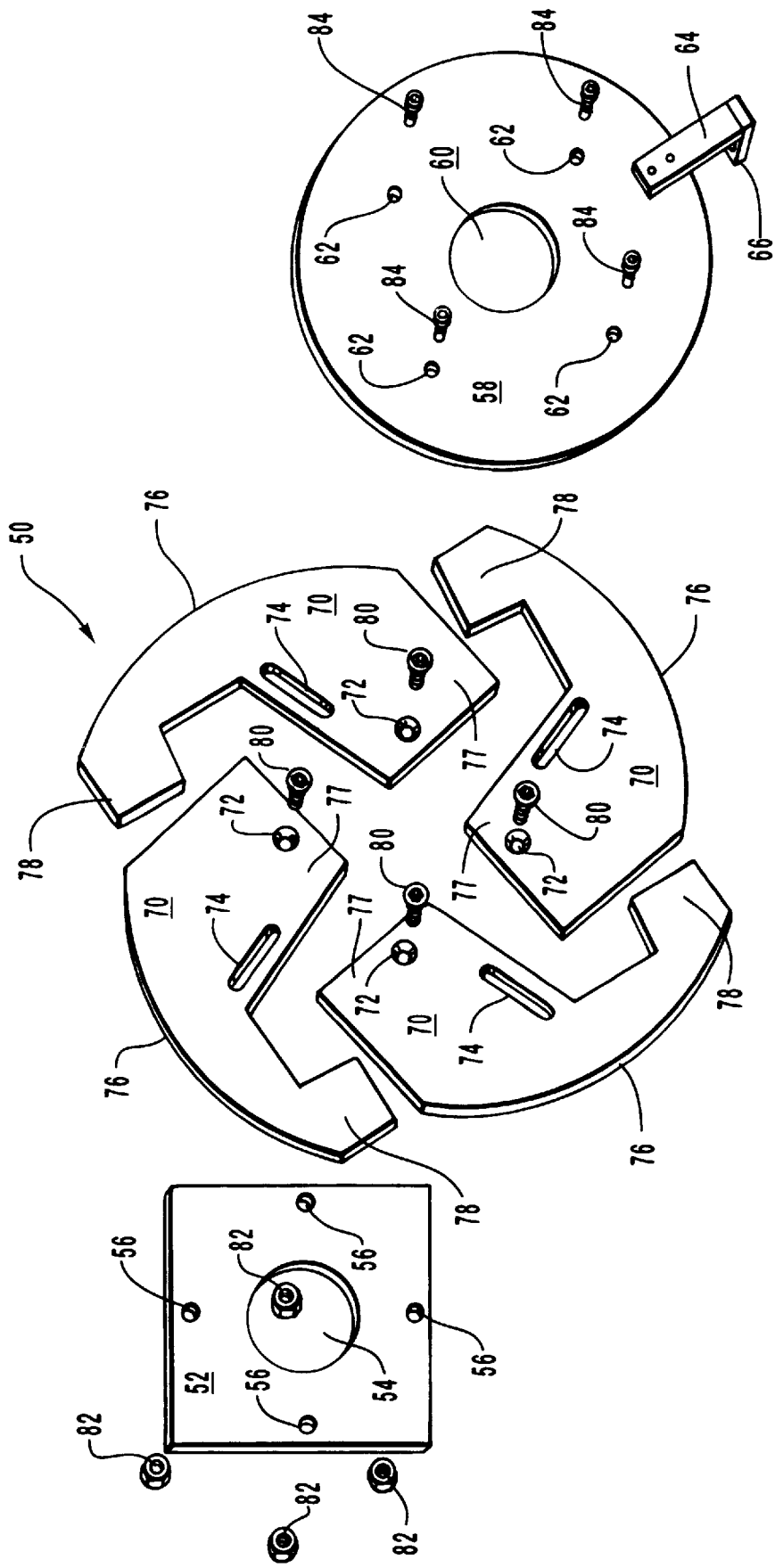
FIG. 3 is a perspective exploded assembly view of the adjustable venturi assembly of FIG. 1, showing the relative positions of a mounting fixture, a plurality of venturi vanes, and a venturi adjusting plate.

FIG. 3 is a perspective exploded assembly view showing the collective components of one embodiment of the adjustable venturi plate assembly 50 and the general spatial relationships between the components. In the depicted embodiment, the adjustable venturi plate assembly 50 comprises a mounting fixture 52 that is rigidly mounted to the fuel-air mixture pipe 28 of FIGS. 1 and 2. The mounting fixture 52 is square in the depicted embodiment, though it will be readily apparent that other shapes would also be acceptable. An adjusting plate 58 is also depicted and is rotatable relative to the mounting fixture 38.

Shown interposed between the mounting fixture 52 and the adjusting plate 58 are four vanes 70. The vanes 70, as seen in FIG. 3, are planar and hook-shaped plates, each having a squared nose 78 and a circular outer edge 76. Each of the vanes 70 has a widened base portion 77 with a pivot hole 72 provided at a bottom corner therein. A slot 74 is located on each of the vanes between the pivot hole 72 and the squared nose 78. The slot 74 extends toward the circular outer edge 76 in an orientation that is directed out of the path of rotation of the adjusting plate 58.

Figure 4:
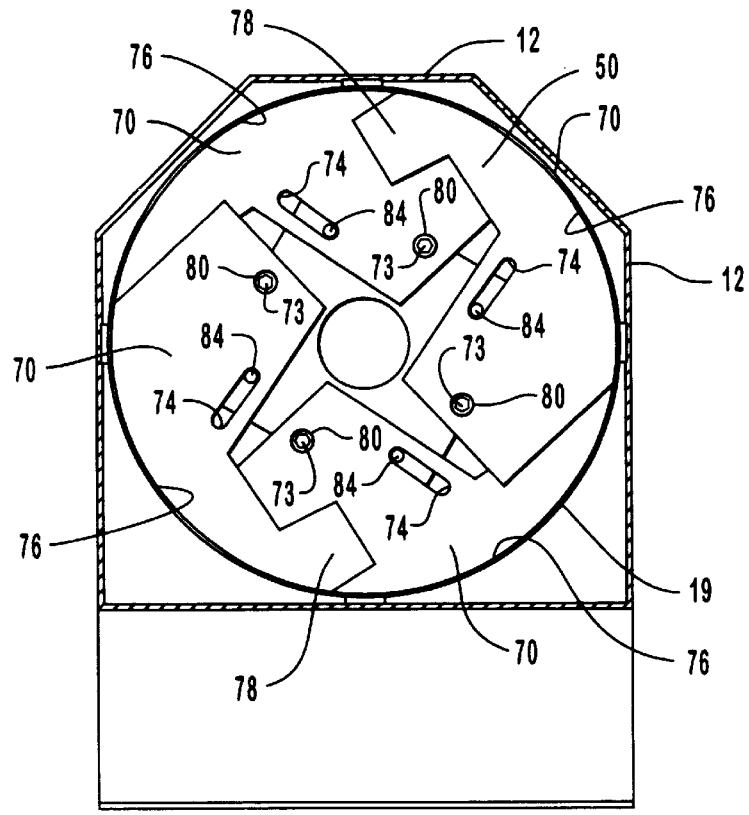
FIG. 4 is a front view of the self-regulating forced-air heater of FIG. 1 showing the vanes of FIG. 3 arranged in a high heat output setting.
Figure 5:
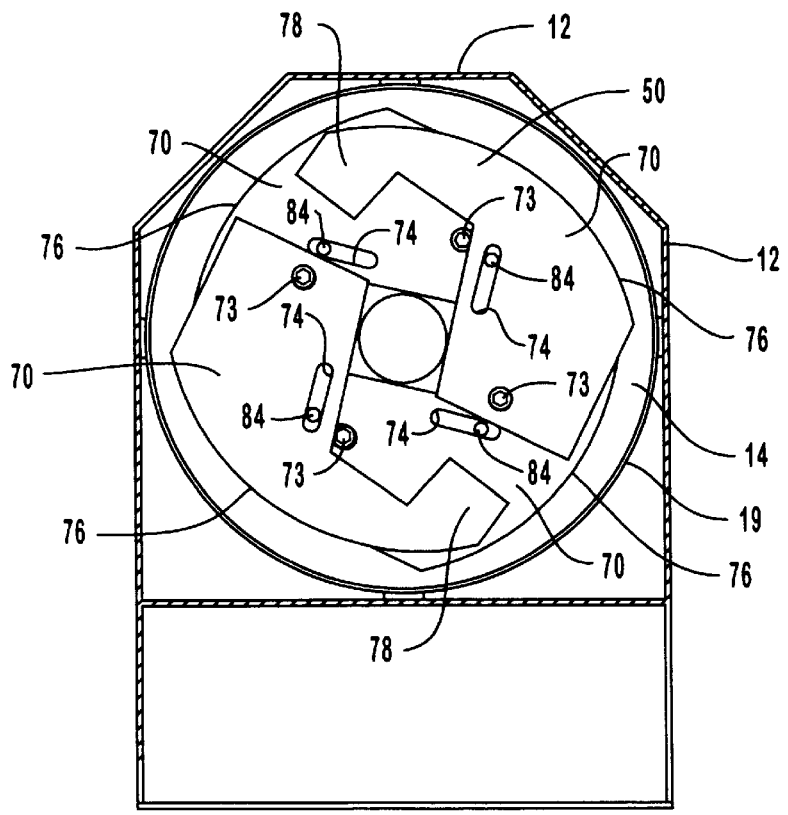
FIG. 5 is a front view of the self-regulating forced-air heater of FIG. 1 showing the vanes of FIG. 3 arranged in a low heat output setting.

The vanes 70 are assembled in the overlapping arrangement shown in the front views of FIGS. 4 and 5, with the circular outer edges 76 at the exterior to form a substantially circular perimeter. Returning momentarily to FIG. 3, fasteners such as bolts 80 and a nuts 82 are used to pivotally connect the vanes 70 to the mounting fixture 52. Other fasteners, such as pins 84 are fixed to the adjusting plate 58 and extend into the slots 74, dynamically linking the adjusting plate 58 with the vanes 70.

FIG. 4 shows the vanes 70 arranged in a less overlapping high surface area arrangement used in the high heat output setting of FIG. 1. FIG. 5 shows the vanes 70 arranged in a more overlapping low surface area arrangement used in the low heat output setting of FIG. 2. Under the present invention, the vanes 70 are preferably electro-mechanically adjustable between the high surface area arrangement of FIG. 4 and the low surface area arrangement of FIG. 5.

In the depicted embodiment of FIG. 1, the venturi adjusting plate 58 is rotatably mounted on the fuel-air mixture pipe 28 adjacent to the vanes 70 and is held in place against an oversized neck 29 of the fuel-air mixture pipe 28. As shown in FIGS. 4 and 5, the pins 84 of the venturi adjusting plate 58 engage the vanes 70, which are pivotally mounted to the mounting fixture 52, through pivot points 73 formed by the pivot holes 72, bolts 80, and nuts 82 of FIG. 3. Due to the orientation of the slots 74, rotation of the adjusting plate 58 in a counter-clockwise direction exerts an inward force on the vanes 70 through the slots 74 and rotates the vanes inward from the high surface area arrangement towards the low surface area arrangement. Rotation of the adjusting plate 58 in the clockwise direction exerts an outward force on the vanes 70 through the slots 74 and rotates the vanes 70 outward from the low surface area arrangement towards the high surface area arrangement.

Outward rotation of the vanes 70 decreases the amount of overlap and expands the combined surface area of the vanes 70, while inward rotation of the vanes 70 increases the amount of overlap and contracts the combined surface area of the vanes 70. Of course, suitable moveable members other than the depicted vanes 70 could also be used to alter the surface area of the adjustable venturi plate assembly 50.

Figure 6:
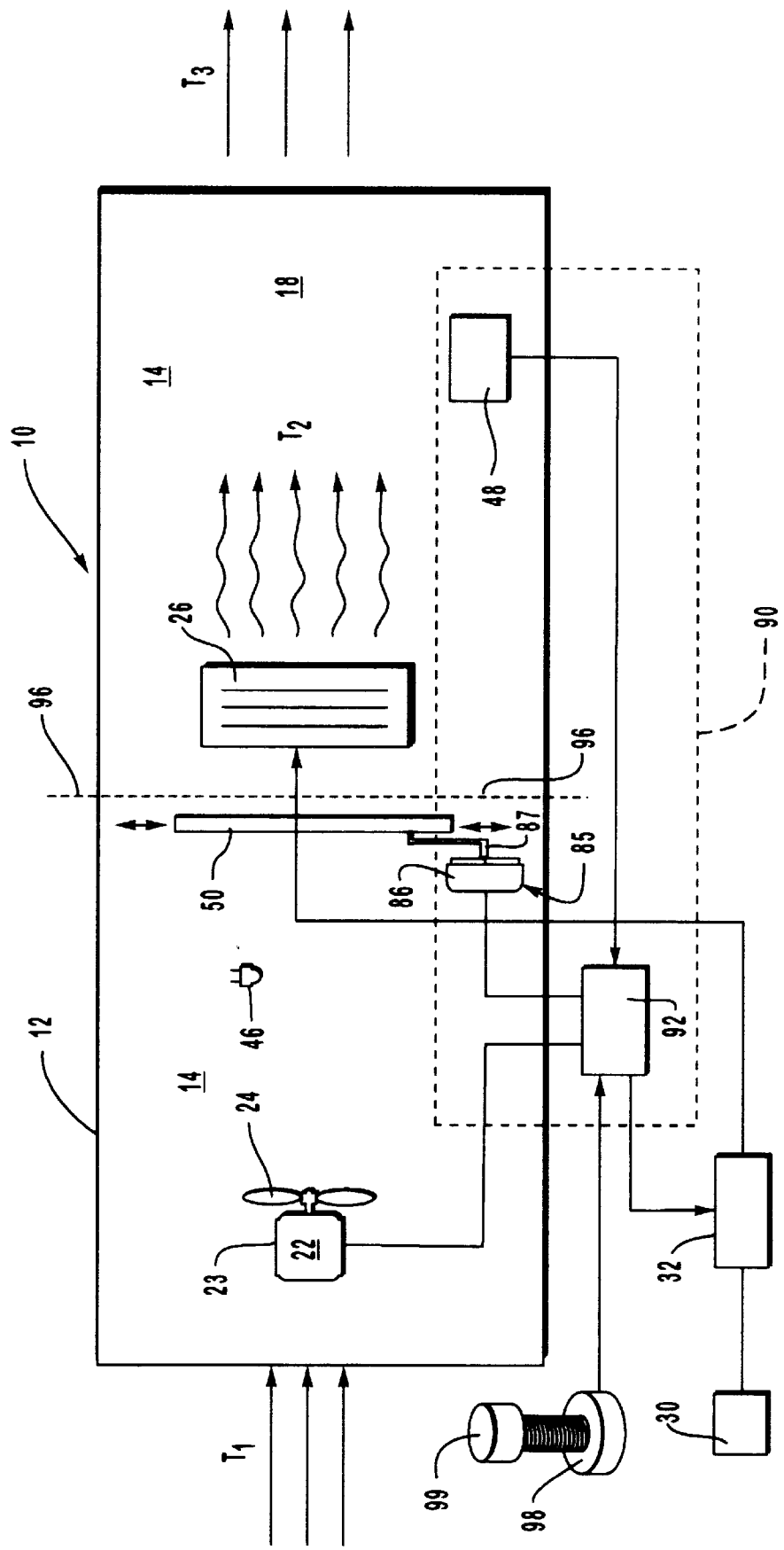
FIG. 6 is a schematic representation of one embodiment of a control assembly of the present invention.

In the depicted embodiment, the speed of the blower 22, the volume of fuel supplied to the burner head 26 by the solenoid valve 32, and the surface area of the adjustable venturi plate assembly 50 are automatically adjusted with the use of a control assembly 90, one embodiment of which is shown in FIG. 6. The control assembly 90, as schematically represented in FIG. 6, includes an electronic controller 92 and a temperature sensor 48 which is used to monitor the temperature of the air exiting the self-regulating forced-air heater housing 12. Additional temperature sensors may also be strategically placed for achieving this purpose. Also included in the control assembly 90 of FIG. 6 are electrical connections connected between the electronic controller 92 and the solenoid valve 32, the variable speed motor 23 of the blower 22, and an output adjusting mechanism 98 that is electrically connected with the electronic controller 92.

The electronic controller 92 can comprise digital logic, a programmable logic device, a programmed microprocessor, or any other suitable electronic control device. In the depicted embodiment, the electronic controller 92 comprises a programmed microprocessor.

An actuator 85 is also included and is used to electro-mechanically adjust the surface area of the adjustable venturi plate assembly 50. The actuator 85 can comprise a linear device such as a solenoid or a rotational device such as a motor. In the embodiment of FIG. 1, the actuator 85 comprises a stepper motor 86. The stepper motor 86, as shown in FIG. 1, is fixed by a bracket 88 to the mounting fixture 52 and is driveably connected through a motor shaft 87 with the adjusting plate 58. A linkage 89 connects the motor shaft 87 to an outward extending portion 66 (also seen in FIG. 3) of a linkage receiving bracket 64, which is, in turn, fastened to the outer edge of the adjusting plate 58. Thus, electro-mechanical rotation of the motor shaft 87 causes rotation of the linkage 89 and corresponding rotation of the adjusting plate 58.

In one manner of operation, the self-regulating forced-air heater 10 of the present invention automatically adjusts itself between the low heat output setting and the high output setting in order to closely maintain a selected heat output level. This selected heat output level is, in one embodiment, originated from an operator with the use of the output adjusting mechanism 98 of FIG. 6. The output adjusting mechanism 98 is, in the depicted embodiment, a potentiometer having a rotatable knob 99. The positioning of the rotatable knob 99 by the operator determines the magnitude of a variable voltage signal indicative of the selected heat output level. The electronic controller 92 reads the signal and calculates the selected heat output level therefrom.

In a further embodiment, the self-regulating forced-air heater 10 is connected with a wall thermostat (not depicted) through which the operator selects a desired temperature of the environment to be heated. This desired temperature, and if desired the actual temperature of the environment being heated, is similarly monitored by the electronic controller 92 and used to determine the selected heat output level.

In one manner of operation of the self-regulating forced-air heater 10 of the present invention, fuel from the fuel source is injected into the fuel-air mixture pipe 28 of FIG. 1 through the nozzle heads 40, 42, where the fuel is allowed to mix with air. This fuel and air mixture is delivered to the burner head 26, where it is ignited and creates combustion within the combustion chamber 18. To create the venturi effect that draws the fuel and air mixture into the combustion chamber 18, the blower 22 draws outside air T1 into the self-regulating forced-air heater 10 through the air inlet opening 16. The blower 22 forces the outside air T1 around the adjustable venturi plate assembly 50 and into the combustion chamber 18. There, this forced air T2 mixes with the partially combusted fuel and air mixture to provide a proper air to fuel ratio for thorough combustion. The combustion heats the forced air T2, and this heated air T3 is then forced out the air outlet opening 20.

During the initial period after powering up the self-regulating forced-air heater 10, the self-regulating forced-air heater 10 operates at the high heat output setting with a heat output level that typically exceeds the selected heat output level. This initial high heat output setting allows the self-regulating forced-air heater 10 to heat up quickly and can be sustained for an extended period of time to quickly heat up the environment being heated. When operating at the high temperature setting, the solenoid valve 32 is fully open, the adjustable venturi plate assembly 50 is fully expanded in the high surface area arrangement, and the blower 22 is set to a high speed.

The electronic controller 92 of FIG. 6 continually monitors the temperature sensor 48 to determine when the temperature of the heated air T3 exiting the combustion chamber 18 surpasses the selected heat output level. The electronic controller 92 allows the self-regulating forced-air heater 10 to continue at the high heat output setting for a selected period of time after determining that the selected heat output level is surpassed and then signals a transition to the low heat output setting.

In the depicted embodiment of FIGS. 1 through 6, the electronic controller 92 causes the self-regulating forced-air heater 10 to transition to the low heat output setting by signaling a decrease in the speed of the blower 22, signaling the stepper motor 86 to transition the adjustable venturi plate assembly 50 into the low surface area arrangement, and signaling the solenoid valve 32 to partially close, reducing the amount of fuel injected into the gas-air mixture pipe 28.

When the temperature sensor 48 indicates that the temperature of the air exiting the self-regulating forced-air heater 10 has dropped below the operating temperature, the electronic controller 92, after a predetermined time period, signals a transition back towards the high heat output setting. In so doing, the electronic controller 92 signals an increase in the speed of the blower 22, signals the stepper motor 86 to transition the adjustable venturi assembly 50 into the high surface area arrangement, and signals the solenoid valve 32 to increase the amount of fuel injected into the gas-air mixture pipe 28.

Once the predetermined operating temperature is again exceeded, the electronic controller 92 once again waits a selected period of time and then signals a return towards the low heat output setting. This process is continuously repeated for the duration of time over which the self-regulating forced-air heater is in use and allows the self-regulating forced-air heater 10 to maintain a substantially constant heat output. Of course, this process is varied where a thermostat is used and requires the selected heat output level to change with changes in the temperature of the environment being heated. Appropriate modifications to accommodate this embodiment will be readily apparent to one of skill in the relevant art, It will also be readily apparent from the above-discussion that using the disclosed self-regulating forced-air heater of the present invention, heat output settings other than just a low and a high heat output setting could also be used. For instance, a greater amount of heat output settings, including possibly a continuously variable setting, could be used to decrease the frequency of adjustment between settings and maintain an even more constant environmental temperature. Additionally, while the self-regulating forced-air heater of the present invention is capable of automatically varying three variables, blower speed, fuel volume, and venturi plate surface area, not all three variables need be varied at once.

As has been discussed above, the variable heat output settings of which the present invention is capable allows the use of a higher initial heat output setting than that provided by conventional forced-air heaters. At the higher heat output setting, an environment can be initially brought to a selected temperature much more quickly than with a conventional forced-air heater. Also, due to the variable heat output settings of which the present invention is capable, the heat produced can be efficiently regulated without completely disabling the self-regulating forced-air heater. Accordingly, the self-regulating forced-air heater of the present invention is capable of consistently and efficiently maintaining a relatively constant heat output and thus, a consistent, comfortable temperature within an environment being heated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A self-regulating forced-air heater, comprising:
    a combustion chamber and an air passageway passing through the combustion chamber, the air passageway being provided with an air inlet opening at a first end thereof and an air outlet opening at a second end thereof;
    a burner disposed within the air passageway upstream of the combustion chamber;

a blower disposed upstream of the burner to force air in the air inlet opening, past the burner, through the combustion chamber, and out the air outlet opening; and an adjustable venturi plate assembly disposed within the air passageway between the blower and the burner, the adjustable venturi plate assembly partially blocking a predetermined segment of the air passageway and having a surface area that is adjustable to selectively alter the extent to which the adjustable venturi plate assembly blocks the predetermined segment of the air passageway.

2. A forced-air heater as recited in claim 1, further comprising a fuel supply conduit connectible to a fuel source and in fluid communication with the burner to supply fuel from the fuel source to the burner.

3. A self-regulating forced-air heater as recited in claim 2, wherein the fuel supply conduit comprises a nozzle and a fuel-air mixture pipe; the fuel supply conduit enabling fuel to be delivered from the fuel source through the nozzle into the fuel-air mixture pipe where the fuel is permitted to mix with air and create a fuel and air mixture that is drawn into the burner.

4. A self-regulating forced-air heater as recited in claim 3, wherein the fuel supply conduit further comprises an electrically-controlled valve disposed upstream of the nozzle to regulate the flow of fuel from the fuel source into the fuel-air mixture pipe.

5. A self-regulating forced-air heater as recited in claim 4, wherein said nozzle comprises a first nozzle head and a second nozzle head, and wherein the fuel supply conduit further comprises a divider valve to apportion and direct the flow of fuel into the first and the second nozzle heads.

6. A self-regulating forced-air heater as recited in claim 1, wherein the adjustable venturi plate assembly comprises a plurality of dynamically connected and partially overlapping moveable members, the moveable members contributing to the surface area of the adjustable venturi plate assembly and being transitionable between a more overlapping arrangement and a less overlapping arrangement, whereby transitioning from the more overlapping arrangement to the less overlapping arrangement expands the surface area of the adjustable venturi plate assembly and transitioning from the less overlapping arrangement to the more overlapping arrangement contracts the surface area of the adjustable venturi plate assembly.

7. A self-regulating forced-air heater as recited in claim 6, wherein the adjustable venturi plate assembly further comprises:

a mounting fixture; and an adjusting member dynamically connected to the mounting fixture and being rotatable with respect to the mounting fixture, and wherein the moveable members comprise vanes pivotally attached to the mounting fixture and dynamically linked with the adjusting member, whereby rotation of the adjusting member relative to the mounting fixture transitions the vanes between the more overlapping arrangement and the less overlapping arrangement.

8. A self-regulating forced-air heater as recited in claim 7, wherein the vanes are positioned within a single plane that is oriented substantially transverse to the flow of air within the air passageway, each of the vanes being substantially planar and comprising a pivot point through which that vane is pivotally connected to the mounting fixture and a slot oriented in a direction extending out from the path of rotation of the adjusting member, and further comprising a plurality of fasteners, each fastener being fixed to the adjusting member and slidably disposed within the slot of one of the vanes such that rotation of the adjusting member relative to the mounting fixture in one direction causes the fastener to slide toward a first end of the slot and forces the vane to pivot around the pivot point and move outward with respect to the path of rotation, thereby transitioning the vanes from the more overlapping arrangement to the less overlapping arrangement, and such that rotation of the adjusting member relative to the mounting fixture in the opposite direction causes the fastener to slide toward a second end of the slot and forces the vane to pivot around the pivot point and move inward with respect to the path of rotation, thereby transitioning the vanes from the less overlapping arrangement to the more overlapping arrangement.

9. A self-regulating forced-air heater as recited in claim 1, further comprising an actuator driveably connected with the adjustable venturi plate assembly and an electronic controller electrically connected with the actuator to signal the actuator to adjust the surface area of the adjustable venturi plate assembly and thereby selectively alter the surface area of the adjustable venturi plate assembly.

10. A self-regulating forced-air heater as recited in claim 9, wherein the actuator comprises a reversible motor having a motor shaft linkably connected with the adjusting member to cause the adjustment of the adjustable venturi plate assembly.

11. A self-regulating forced-air heater as recited in claim 9, wherein the blower has a variable speed, and wherein the electronic controller is electrically connected with the blower to adjustably control the speed of the blower and thereby regulate the velocity of the air forced into the combustion chamber.

12. A self-regulating forced-air heater as recited in claim 11, further comprising a fuel supply conduit in fluid communication with the burner and having an electrically controlled valve interposed within the fuel supply conduit, the electronic controller being electrically connected with the electrically controlled valve to adjustably control the volume of fuel that is delivered by the fuel supply conduit to the burner.

13. A self-regulating forced-air heater as recited in claim 12, further comprising a temperature sensor electrically connected with the electronic controller and disposed to determine the temperature of the heated air leaving the combustion chamber; and wherein the electronic controller is programmed such that in response to temperature data received from the temperature sensor, the electronic controller electrically communicates with the blower to signal an adjustment in the speed of the blower, electrically communicates with the electrically controlled valve to signal an adjustment in the volume of fuel delivered to the burner, and electrically communicates with the actuator to signal the actuator to adjust the surface area of the adjustable venturi plate assembly.

14. A self-regulating forced-air heater comprising:

a combustion chamber and an air passageway passing through the combustion chamber, the air passageway being provided with an air inlet opening at a first end thereof and an air outlet opening at a second end thereof, a burner disposed within the air passageway proximal to and upstream of the combustion chamber;

a fuel supply conduit connectible to a fuel source and having an electrically controlled valve interposed within the fuel supply conduit;

a variable speed blower disposed upstream of the burner to force air in the air inlet opening, past the burner, through the combustion chamber, and out the air outlet opening;

an adjustable venturi plate assembly disposed within the air passageway between the blower and the burner, the adjustable venturi plate assembly partially blocking a predetermined segment of the air passageway and having a surface area that is adjustable to selectively alter the extent to which the predetermined segment of the air passageway is blocked;

an actuator driveably connected with the adjustable venturi plate assembly to adjust the surface area of the adjustable venturi plate assembly and thereby selectively alter the extent to which the adjustable venturi plate assembly blocks the air passageway;

a temperature sensor disposed to determine the temperature of heated air leaving the combustion chamber; and an electronic controller electrically connected with the temperature sensor to receive temperature data indicative of the temperature of the air forced out of the combustion chamber, with the actuator to signal the adjustment of the surface area of the adjustable venturi plate assembly, with the blower to signal an adjustment in the velocity of the air forced into the combustion chamber, and with the electrically controlled valve to signal an adjustment in a volume of fuel delivered by the fuel supply conduit to the burner.

15. A self-regulating forced-air heater as recited in claim 14, wherein the electronic controller is programmed such that in response to the temperature data received from the temperature sensor the electronic controller electrically communicates with the blower to signal an adjustment in the speed of the blower, electrically communicates with the electrically controlled valve to signal the electrically controlled valve to adjust the volume of fuel delivered to the burner, and electrically communicates with the actuator to signal the actuator to adjust the surface area of the adjustable venturi plate assembly.

16. A self-regulating forced-air heater as recited in claim 14, wherein the fuel supply conduit comprises a nozzle and a fuel-air mixture pipe; the fuel supply conduit enabling fuel to be delivered from the fuel source through the nozzle into the fuel-air mixture pipe where the fuel is permitted to mix with air and create a fuel and air mixture that is drawn into the burner.

17. A self-regulating forced-air heater as recited in claim 14, wherein the adjustable venturi plate assembly comprises a plurality of dynamically connected and partially overlapping moveable members, the moveable members contributing to the surface area of the adjustable venturi plate assembly and being electro-mechanically transitionable between a more overlapping arrangement and a less overlapping arrangement to selectively alter the surface area of the adjustable venturi plate assembly.

18. A self-regulating forced-air heater as recited in claim 17, wherein the adjustable venturi plate assembly further comprises:
   a mounting fixture; and
   an adjusting member dynamically connected to the mounting fixture and being rotatable with respect to the mounting fixture, and wherein the moveable members comprise vanes pivotally attached to the mounting fixture and dynamically linked with the adjusting member, whereby rotation of the adjusting member relative to the mounting fixture transitions the vanes between the more overlapping arrangement and the less overlapping arrangement.

19. A self-regulating forced-air heater as recited in claim 18, wherein the vanes are positioned within a single plane that is oriented substantially transverse to the flow of air within the air passageway, each of the vanes being substantially planar and comprising a pivot point through which that vane is pivotally connected to the mounting fixture and a slot oriented in a direction extending out from the path of rotation of the adjusting member, and further comprising a plurality of fasteners, each fastener being fixed to the adjusting member and slidably disposed within the slot of one of the vanes such that rotation of the adjusting member relative to the mounting fixture in one direction causes the fastener to slide toward a first end of the slot and forces the vane to pivot around the pivot point and move outward with respect to the path of rotation, thereby transitioning the vanes from the more overlapping arrangement to the less overlapping arrangement, and such that rotation of the adjusting member relative to the mounting fixture in the opposite direction causes the fastener to slide toward a second end of the slot and forces the vane to pivot around the pivot point and move inward with respect to the path of rotation, thereby transitioning the vanes from the less overlapping arrangement to the more overlapping arrangement.

20. A self-regulating forced-air heater as recited in claim 17, wherein the actuator comprises a reversible motor having a motor shaft linkably connected to the adjusting member.

21. A self-regulating forced-air heater comprising:
   a combustion chamber and an air passageway passing through the combustion chamber, the air passageway being provided with an air inlet opening at a first end thereof and an air outlet opening at a second end thereof;
   a burner disposed within the air passageway proximal to and upstream of the combustion chamber;
   a blower disposed upstream of the burner to force air in the air inlet opening, past the burner, through the combustion chamber, and out the air outlet opening;
   an adjustable venturi plate assembly disposed within the air passageway between the blower and the burner, the adjustable venturi plate assembly partially blocking a predetermined segment of the air passageway and having a surface area that is electro-mechanically adjustable to selectively alter the extent to which the adjustable venturi plate assembly blocks the predetermined segment of the air passageway, the adjustable venturi plate assembly comprising:
      a mounting fixture,
      an adjusting member dynamically connected to the mounting fixture and being electro-mechanically rotatable with respect to the mounting fixture,
      a plurality of substantially planar, dynamically connected vanes contributing to the surface area of the adjustable venturi plate assembly, the vanes being positioned between the mounting fixture and the adjusting member in an overlapping arrangement within a single plane that is oriented substantially transverse to the flow of air within the air passageway, each of the vanes being substantially planar and comprising a pivot point through which that vane is pivotally connected to the mounting fixture and a slot oriented in a direction extending out from the path of rotation of the adjusting member, and
      a plurality of fasteners, each fastener being fixed to the adjusting member and slidably disposed within the slot of one of the vanes such that rotation of the adjusting member relative to the mounting fixture in one direction causes the fastener to slide toward a first end of the slot and forces the vane to pivot around the pivot point and move outward with respect to the path of rotation, thereby transitioning the vanes from a more overlapping arrangement to a less overlapping arrangement, and such that rotation of the adjusting member relative to the mounting fixture in the opposite direction causes the fastener to slide toward a second end of the slot and forces the vane to pivot around the pivot point and move inward with respect to the path of rotation, thereby transitioning the vanes from the less overlapping arrangement to the more overlapping arrangement.

22. A method of operating a forced-air heater, comprising the steps of:

providing a forced-air heater having a constant and non-zero high heat output setting and a constant and non-zero low heat output setting, the forced-air heater comprising:
 a combustion chamber and an air passageway passing through the combustion chamber, the air passageway being provided with an air inlet opening at a first end thereof and an air outlet opening at a second end thereof,
 a burner disposed within the air passageway proximal to and upstream of the combustion chamber,
 a blower directed toward the combustion chamber to force air from the air inlet opening past the burner, through the combustion chamber, and out the air outlet opening, and
 a venturi plate disposed within the air passageway between the blower and the burner, the venturi plate having an adjustable surface area partially blocking a predetermined segment of the air passageway;

operating the forced-air heater at the high heat output setting for a first period of time wherein the surface area of the venturi plate is adjusted to a first surface area;

transitioning the forced-air heater from the high heat output setting to the low heat output setting; and operating the forced-air heater at the low heat output setting for a second period of time wherein the surface area of the venturi plate is adjusted to a second surface area, the second surface area being smaller than the first surface area.

23. A method of operating a forced-air heater as recited in claim 22, wherein the venturi plate comprises a plurality of dynamically connected and partially overlapping moveable members, the moveable members contributing to the surface area of the venturi plate and having a less overlapping arrangement defining the first surface area and a more overlapping arrangement defining the second surface area, and wherein the step of transitioning the forced-air heater from the high heat output setting to the low heat output setting comprises repositioning the moveable members from the less overlapping arrangement to the more overlapping arrangement, thereby reducing the surface area of the venturi plate assembly.

24. A method of operating a forced-air heater as recited in claim 22, wherein the forced-air heater further comprises an electronic controller, and further comprising the additional step of transitioning the forced-air heater from the low heat output setting to the high heat output setting, and wherein the steps of transitioning the forced-air heater from the high heat output setting to the low heat output setting and from the low heat output setting to the high heat output setting are signaled by the electronic controller in response to temperature data received from a temperature sensor.

25. A method of operating a forced-air heater as recited in claim 24, wherein the steps of transitioning the forced-air heater from the high heat output setting to the low heat output setting and from the low heat output setting to the high heat output setting each further comprise signaling with the electronic controller three separate adjustment operations, each of which separately contributes to the temperature of the air forced out the air outlet opening.

26. A method of operating a forced-air heater as recited in claim 25, wherein the three separate adjustment operations comprise adjusting a surface area of the venturi plate, adjusting a volume of fuel being passed to the burner, and adjusting the speed at which the blower operates.

* * * * *